United States Patent
Hsing et al.

(10) Patent No.: US 7,581,571 B2
(45) Date of Patent: Sep. 1, 2009

(54) MANUALLY OPERABLE MANIFOLD/NOZZLE CLOSURE FOR FLUID DISPENSER

(75) Inventors: John Hsing, Chicago, IL (US); Christopher Khoo, Lake in the Hills, IL (US)

(73) Assignee: Fluid Managment Operations, LLC, Wheeling, IL (US)

( * ) Notice: Subject to any disclaimer, the term of this patent is extended or adjusted under 35 U.S.C. 154(b) by 0 days.

(21) Appl. No.: 11/686,155

(22) Filed: Mar. 14, 2007

(65) Prior Publication Data
US 2008/0223480 A1 Sep. 18, 2008

(51) Int. Cl.
B65B 3/04 (2006.01)
B67C 3/02 (2006.01)
F16K 23/00 (2006.01)

(52) U.S. Cl. .................. 141/87; 141/90; 141/311 A; 141/360; 141/362; 137/313

(58) Field of Classification Search ............. 141/85–91, 141/311 A, 351, 360, 362; 222/108, 533, 222/562; 137/312–313; 239/104, 120–122
See application file for complete search history.

(56) References Cited

U.S. PATENT DOCUMENTS

| | | | | |
|---|---|---|---|---|
| 4,469,148 A | * | 9/1984 | Vogele et al. ................. | 141/87 |
| 5,562,129 A | * | 10/1996 | Graffin ......................... | 141/90 |
| 5,784,854 A | * | 7/1998 | Mazzalveri ................... | 141/90 |
| 5,842,641 A | * | 12/1998 | Mazzalveri .................. | 239/104 |
| 6,135,173 A | * | 10/2000 | Lee et al. ..................... | 141/351 |
| 7,163,037 B2 | * | 1/2007 | Walkowski .................. | 141/350 |
| 7,228,879 B2 | * | 6/2007 | Miller et al. ................. | 141/271 |
| 7,261,131 B2 | * | 8/2007 | Cleveland et al. ....... | 141/311 A |
| 2005/0205154 A1 | | 9/2005 | Cleveland et al. | |
| 2007/0012376 A1 | * | 1/2007 | Khoo et al. .................... | 141/87 |
| 2007/0012378 A1 | * | 1/2007 | Miller et al. ................ | 141/104 |

* cited by examiner

Primary Examiner—Timothy L Maust
Assistant Examiner—Nicolas A Arnett
(74) Attorney, Agent, or Firm—Miller, Matthias & Hull

(57) ABSTRACT

A manually operated seal/closure system for a fluid dispenser manifold is disclosed. The manifold includes at least one nozzle and, more typically, a plurality of nozzles ranging from more than one to twelve or more. The manifold housing includes a sidewall or other stationary structure. The stationary sidewall is pivotally connected to an arm. The sidewall further includes a lateral slot and a curved slot. The arm includes a proximal end pivotally connected to the sidewall and a distal end with an elongated slot disposed therebetween. The closure system also includes a bracket for supporting a cup and a seal. The bracket is coupled to the arm and the sidewall by a first pin that extends from the bracket through the lateral slot in the sidewall and through the elongated slot of the arm. The brackets also coupled to the sidewall by a second pin that extends through the lateral slot of the sidewall and laterally between the first pin and the manifold.

18 Claims, 7 Drawing Sheets

FIG. 11
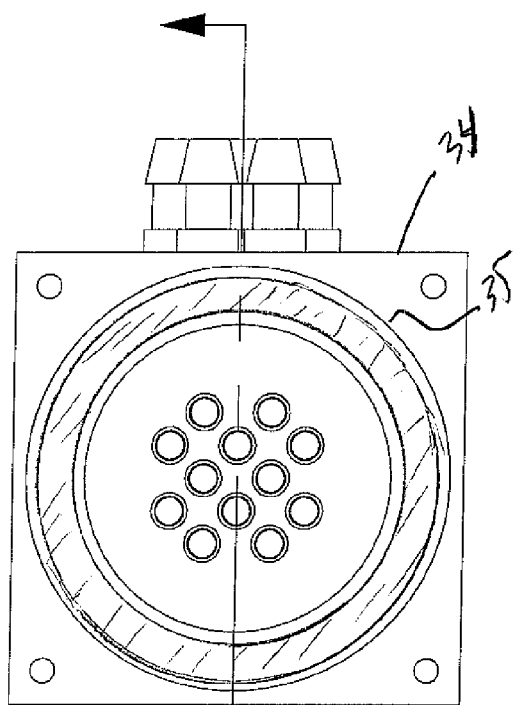
FIG. 12
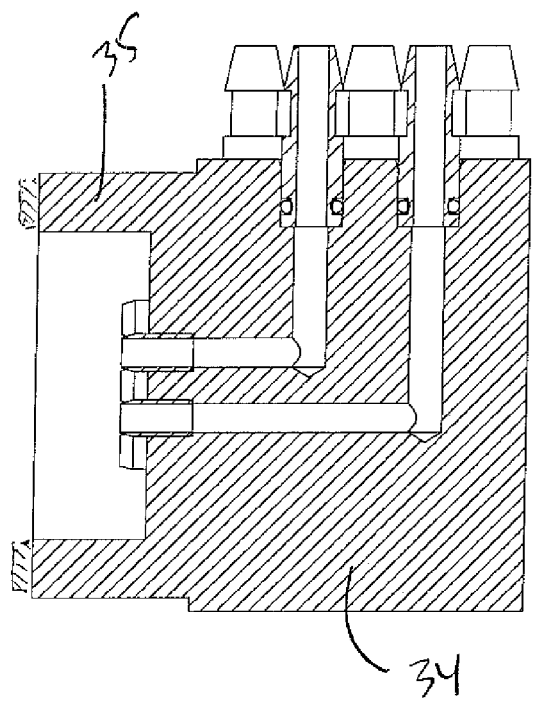
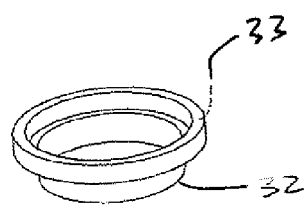
FIG 13
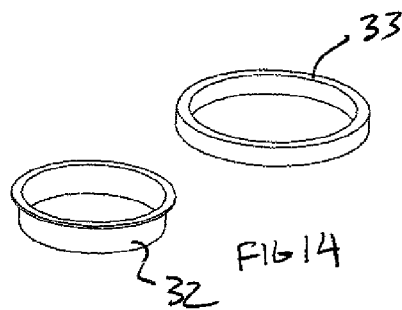
FIG 14
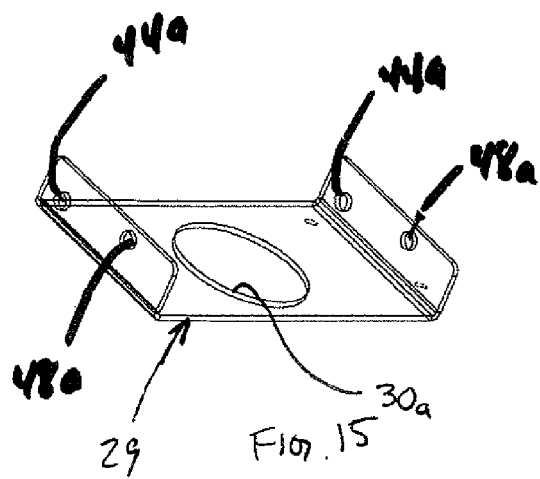
FIG. 15

MANUALLY OPERABLE MANIFOLD/NOZZLE CLOSURE FOR FLUID DISPENSER

BACKGROUND

1. Technical Field

An improved manifold/nozzle closure system for fluid dispensers is shown and described. The disclosed closure system is a manual system that, in a closed position, provides a cover/closure and a seal for a manifold/nozzle through which one or more fluids are dispensed. In the closed position, the closure element is disposed beneath the manifold or nozzle where it collects any fluid drippings between dispensing operations and provides a sealing effect to prevent dried material from clogging the nozzle(s). To move the closure system to an open or to a dispense position, an easily accessible push plate is provided which, when pushed away from the user and towards the machine housing, moves the closure element downward before pivoting the closure element laterally rearward and away from the nozzle or manifold. After the fluid is dispensed, a biasing element returns the closure element back to a sealing engagement with the manifold/nozzle. The closure element preferably includes a removable cup and a soft seal, either of which may be disposable and/or cleanable.

2. Description of the Related Art

Systems for dispensing a plurality of different fluids into a container have been known and used for many years. For example, systems for dispensing paint base materials and colorants into a paint container are known. These paint systems may use twenty or more different colorants to formulate a paint mixture. Each colorant is contained in a separate canister or package and may include its own dispensing pump. The colorants and the respective pumps may be disposed on a turntable or along one or more horizontal rows. In a turntable system, the turntable is rotated so that the colorant to be dispensed is moved to a position above the container being filled. In designs using one or more horizontal rows, the container may be moved laterally to the appropriate colorant/pump.

Systems for dispensing large varieties of different fluids are not limited to paints, but also include systems for dispensing pharmaceutical products, hair dye formulas, cosmetics of all kinds, nail polish, etc. Some systems for use in preparing products at a point of sale may use a stationary manifold through which a plurality of nozzles extend. Each fluid to be dispensed is then pumped through its own individual nozzle that is accommodated in the manifold. Depending upon the size of the container and the quantity of the fluids to be dispensed, manifolds can be designed in a space efficient manner so that a single manifold can accommodate twenty or more different nozzles. The nozzles are connected to the various ingredients by flexible hoses and the ingredients are contained in stationary canisters or containers.

In many fluid dispensing applications, precision is essential as many formulations require the addition of precise amounts of certain ingredients. This is true in the pharmaceutical industry but also in the paint and cosmetic industries as the addition of more or less tints or colorants can result in a visible change in the color of the resulting product.

One way in which the precision of dispensing systems is compromised is "dripping." Specifically, a "leftover" drip may be hanging from a nozzle that was intended to be added to a previous formulation and, with a new container in place under the nozzle, the drop of liquid intended for a previous formulation may be erroneously added to a new formulation. Thus, the previous container may not receive the desired amount of the liquid ingredient and the next container may receive too much.

To solve the drip problem, various scraper and wiper designs have been proposed. However, these designs often require one or more different motors to operate the wiper element and are limited to use on dispensing systems where the nozzles are separated or not bundled together in a manifold. Use of a wiper or scraping function would not be practical in a multiple nozzle manifold design as the ingredients from the different nozzles will be co-mingled by the wiper or scraper which would then also contribute to the lack of precision of subsequently produced formulations.

Another problem associated with dispensing systems that make use of nozzles lies in the dispensing of relatively viscous liquids such as tints, colorants, base materials for cosmetic products, certain pharmaceutical ingredients or other fluid materials having relatively high viscosities. Specifically, the viscous fluids have a tendency to dry and cake onto the end of the nozzles, thereby requiring frequent cleaning in order for the nozzles to operate effectively. While some mechanical wiping or scrapping devices are available, these devices are not practical for multiple nozzle manifold systems and the scraper or wiper element must be manually cleaned anyway.

One solution provided in commonly assigned US 2005/0205154 is a mechanized closure element that covets and seals from beneath the manifold after the dispensing operation is complete. In this manner, the viscous materials being dispensed through the nozzles have less exposure to air thereby requiring a lower frequency of cleaning operations However, the mechanized system of US 2005/0205154 requires modification of the existing system software. Thus, it is relatively expensive and is difficult to add to an existing system as a retrofit. Thus, a more economical approach is needed.

SUMMARY A OF THE DISCLOSURE

In satisfaction of the aforenoted needs, an improved closure system for one or more fluid outlets is disclosed.

A disclosed manifold and closure system for a fluid dispenser comprises a manifold housing that supports a manifold. The manifold comprises at least one nozzle and, more typically, a plurality of nozzles ranging from more than one to twelve or more. The manifold housing comprises a sidewall or other stationary structure. The sidewall or stationary structure is pivotally connected to an arm. The sidewall or stationary structure further comprises a lateral slot and a curved slot. The arm comprises a proximal end pivotally connected to the sidewall or stationary structure. The arm further comprises a distal end and an elongated slot disposed between the proximal and distal ends of the arm. The closure system also comprises a bracket for supporting a cup and a seal. The bracket is coupled to the arm and the sidewall or stationary structure by a first pin that extends from the bracket through the lateral slot in the sidewall or stationary structure and through the elongated slot of the arm. The bracket is also coupled to the sidewall by a second pin that extends through the lateral slot of the sidewall and laterally between the first pin and the manifold.

The slots disposed in the sidewall control the relative movement of the bracket with respect to the manifold. Specifically, the lateral slot in the sidewall curves upwardly at its forward end. The bracket is connected to pins that ride in this lateral slot. As the second pin (or front pin) teaches the forward end of the lateral slot, it follows the upward path of the end of the slot thereby effectuating sealing engagement between the seal in the manifold.

In a refinement, the system includes a pair of arms and a pair of stationary sidewalls that include the like or identical slots.

In another refinement, a biasing member is employed that biases the arm and bracket laterally into the sealing engagement with the manifold. In another refinement, the biasing member is a spring.

In another refinement, at least one of the bracket or arm is connected to a convenient handle or push plate to move the closure system from the closed or sealed position to an open or dispense position where a container may be disposed below the manifold.

In a refinement, the cup is removable from the seal and bracket. In another refinement, the cup is disposable. In another refinement, the cup and seal are connected and are removable and/or disposable. In still another alternative refinement, the seal is disposed on the manifold or seal members are disposed on both the cup and manifold. Obviously, numerous variations are possible and will be apparent to those skilled in the art.

A closure system for a fluid outlet is also disclosed. One disclosed closure system comprises a housing comprising a pair of spaced-apart sidewalls, a pail of spaced-apart arms, and a bracket extending between and connecting the arms. Each sidewall is pivotally connected to a proximal end of one arm and each sidewall comprises a lateral slot and a curved slot. Each arm further comprises a distal end and an elongated slot disposed between the proximal and distal ends of the arm. The bracket supports a cup and a seal and is disposed between and coupled to the arms and sidewalls by a first pair of oppositely directed pins that extend outward from the bracket. Each pin of the first pair of pins extends through the lateral slot in one of the sidewalls and through the elongated slot of one of the arms. The bracket also is coupled to each sidewall by a second pair of oppositely directed pins that extend outward from the bracket. Each pin of the second pair of pins extends through the lateral slot of one of the sidewalls of and laterally between the first pair of pins and the distal ends of the arms.

The slots disposed in the sidewalls are identical or similar dimensionally and spatially and are used control the relative movement of the bracket. The lateral slots in the sidewalls curve upwardly at their forward ends. The bracket is connected to two pair of pins, or four pins in total, that ride in these lateral slots. As the second pair of pins (or front pair of pins) reaches the forward ends of their respective lateral slots, they follow the upward path of the forward ends of the slots thereby causing the bracket to move upward into a closed/sealing position.

In a refinement, a pair of biasing members are provided that bias each arm and the bracket towards the closed or sealed position. In a refinement the biasing members comprise a pair of springs linking each arm to one of the sidewalls.

In another refinement, a push plate disposed between and connecting distal ends of the arms.

A disclosed method for dispensing fluid comprises: providing a closure element with a seal member below a nozzle manifold wherein the closure element provides a sealing cover below the manifold to protect the manifold and fluid contained therein from the ambient atmosphere; moving the closure element vertically downward and laterally rearward away from the nozzle; dispensing fluid from the nozzle; moving the closure element laterally forward and then vertically upward back the area beneath the nozzle; and engaging the closure element with said seal member against the manifold under force imposed by a biasing member.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIGS. 11 and 12 are bottom plan and side plan views of the manifold block equipped with an optional seal element;

FIG. 13 is a perspective view of the cup/seal combination;

FIG. 14 is an exploded view of the cup and seal; and

FIG. 15 is a perspective view of the cup/seal bracket

While a single embodiment is shown and described, alternative embodiments and variations will be described below and still other variations will be apparent to those skilled in the art. It should also be understood that the drawings are not necessarily to scale and that the disclosed embodiment is sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiment illustrated herein.

DETAILED DESCRIPTION OF THE PRESENTLY PREFERRED EMBODIMENTS

Figure 1:
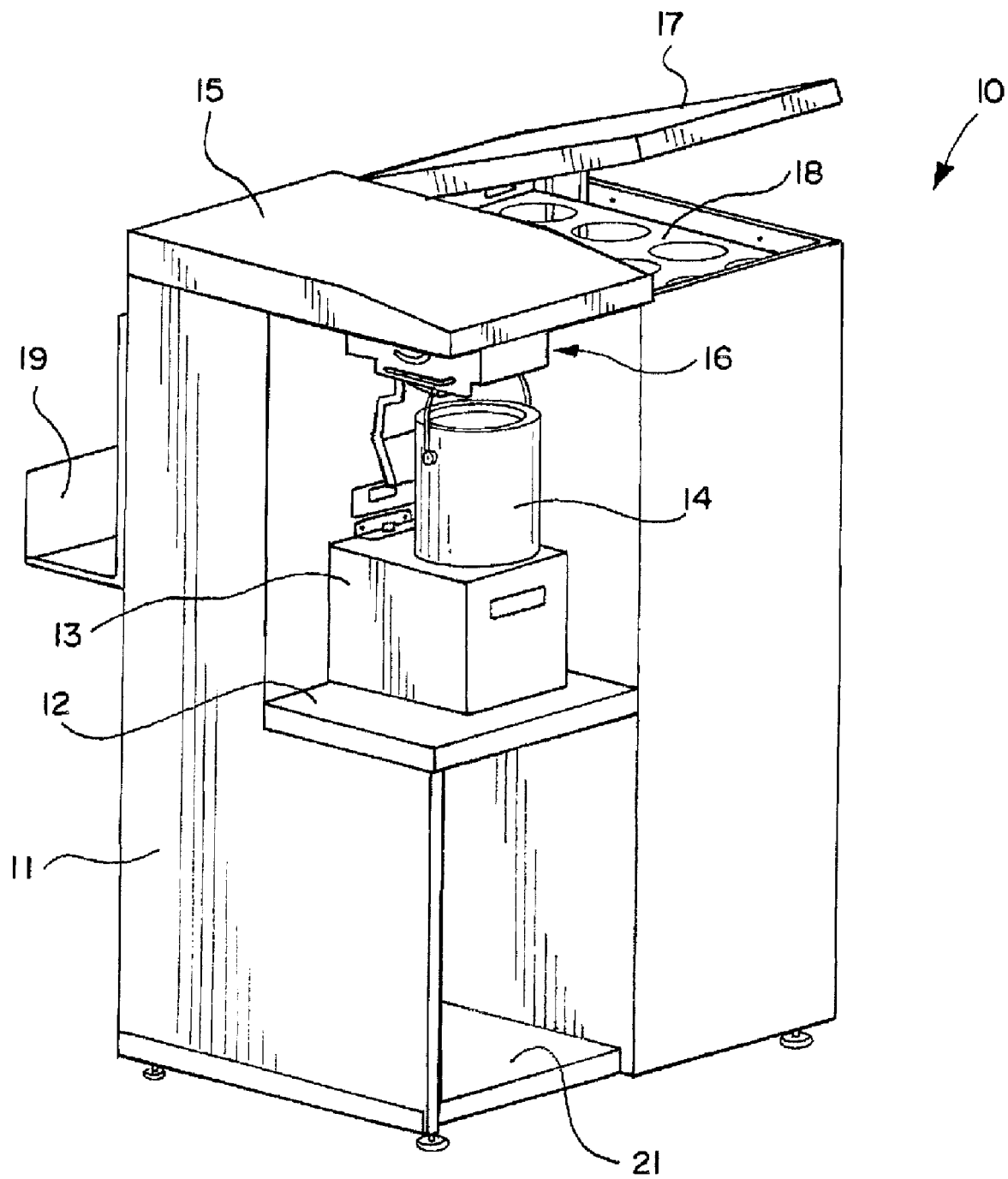
FIG. 1 is a left front perspective view of a fluid dispensing system equipped with a manual manifold/nozzle closure mechanism made in accordance with this disclosure as well as a container for receiving dispensed fluid disposed beneath the manifold whereby the closure mechanism is in the open or dispense position.

Turning to FIG. 1, a fluid dispensing system 10 is disclosed which includes a housing 11 that includes a platform 12 for supporting a container to be filled. In a particular scenario illustrated in FIG. 1, an additional support 13 is provided for supporting a smaller container 14, such as a one-gallon can as shown. Removal of the support 13 allows the dispenser can to accommodate a larger pail, such as a five-gallon pail. A manifold cover 15 covers and protects the manifold housing 16 and a canister cover 17 covers and protects a plurality of canisters accommodated in the canister support plate shown at 18 (the canisters are not shown in FIG. 1). The rear bracket 19 may be used for the storage of bulk or base materials. An additional storage compartment is shown at 21.

Figure 2:
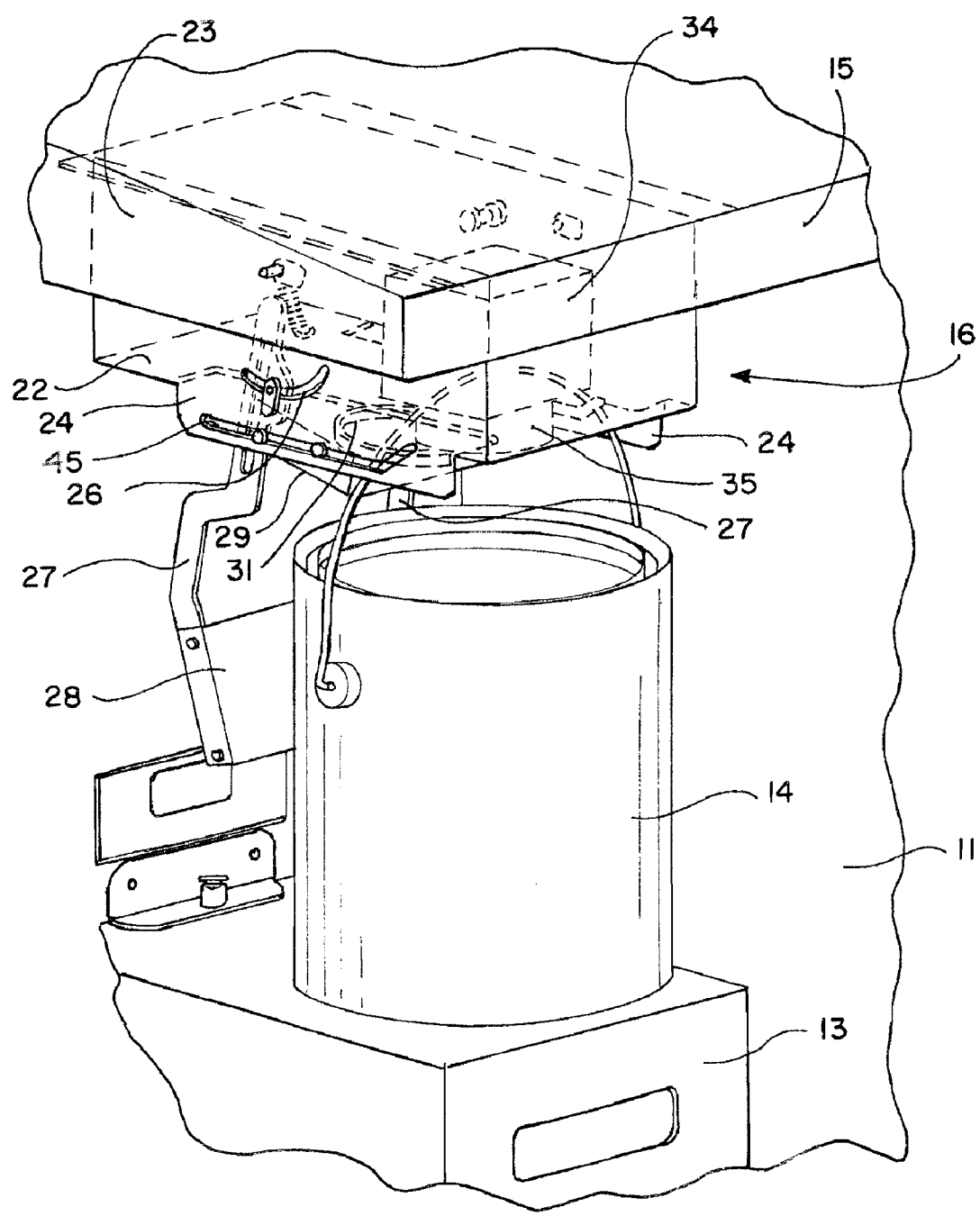
FIG. 2 is a partial left front perspective view of the fluid dispensing system, manifold/nozzle closure mechanism, and container as shown in FIG. 1.

Turning to FIG. 2, the manifold housing 16 is shown in greater detail. The housing 16 is includes a bottom floor 22 disposed between opposing sidewalls 23. The opposing sidewalls 23 are each connected integrally to a lower extension, both of which are shown at 24. Each lower extension includes a lateral slot 25. Each sidewall also includes a curved slot 26. The slots 25, 26 are used to control the movement of the spaced-apart arms 27. The spaced-apart arms 27 are connected together by two elements, the push plate 28 and the cup/seal bracket 29. The cup/seal bracket 29 includes an opening 31 for accommodating a combination drip catcher cup and manifold seal. The cup is shown in phantom at 32 in FIGS. 3 and 5 while the seal is shown at 33 in FIGS. 4 and 6. The seal 33 can be made from a variety of different soft materials with elastomeric properties. The specific material from which the seal 33 is made is not crucial and various alternatives will be apparent to those skilled in the art.

Figure 9:
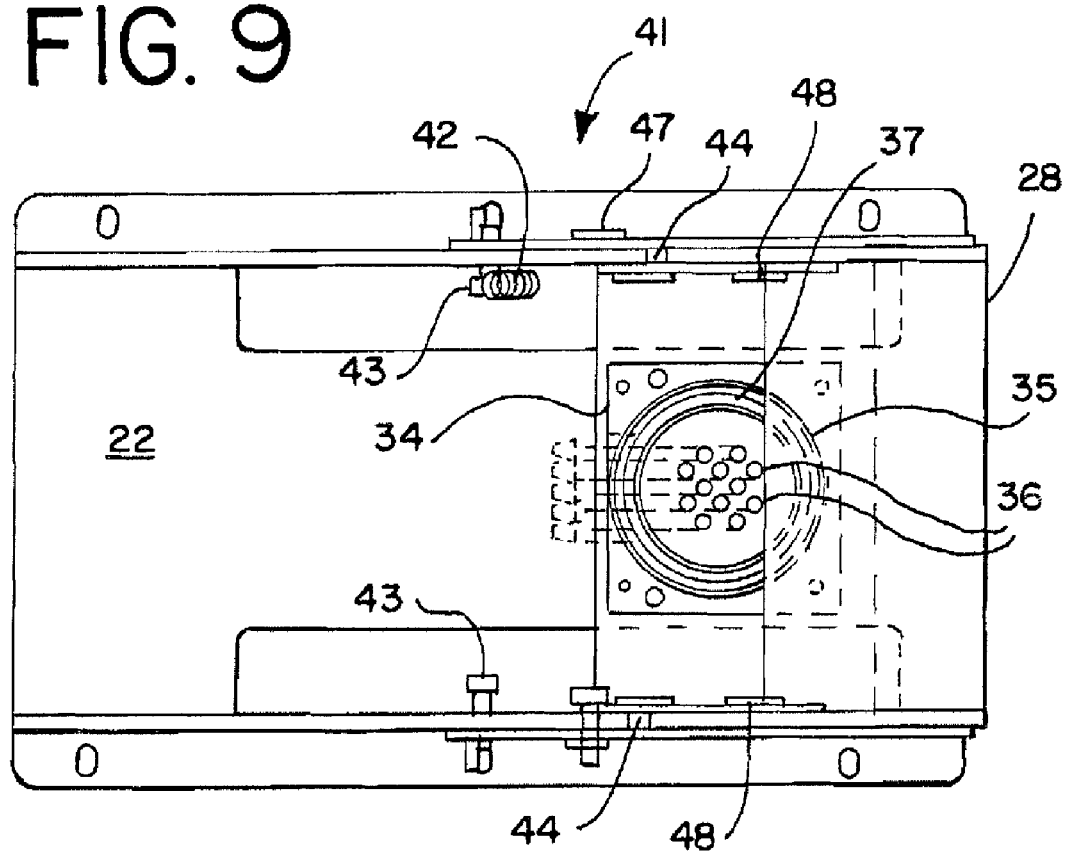
FIGS. 9 and 10 are bottom plan views of the closure mechanism shown in FIGS. 1-8.

The manifold comprises an upper block 34 connected to a plurality of inlet lines (not shown) and a lower extension 35 for accommodating the nozzles 36 (see FIG. 9). The lower rim 37 engages the seal 33 to prevent drying out of material disposed in the nozzles 36 and, consequently, the clogging of the nozzles.

Figure 3:
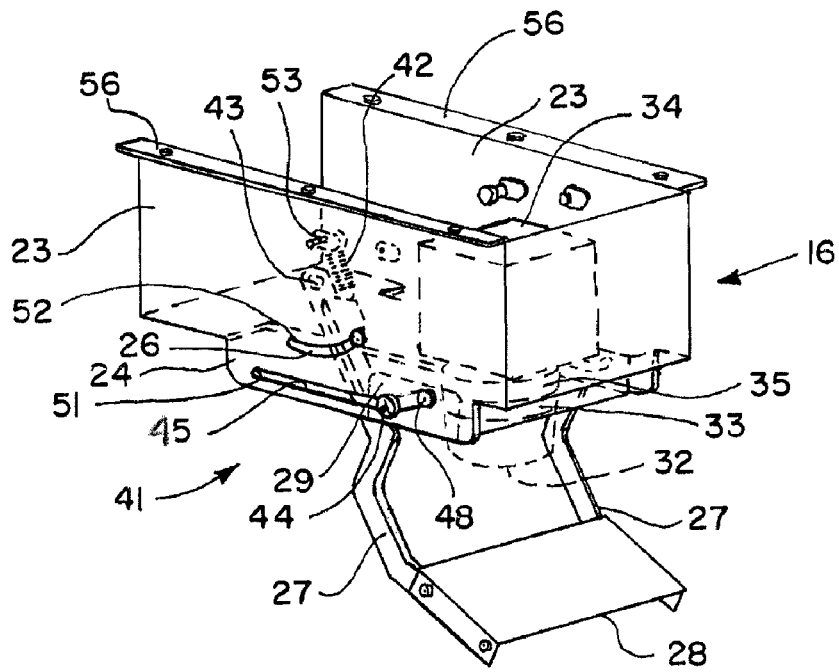
FIG. 3 is left front perspective view of the manifold/nozzle closure mechanism shown in FIGS. 1 and 2 in the closed or sealed position.

Turning to FIGS. 3-6, the movement of the closure mechanism 41 between the closed/seal position (FIG. 3) and open/dispense position (FIG. 4) will be described in greater detail. Turning first to FIG. 3, the arms 27, push plate 28, cup/seal bracket 29, cup 32 and seal 33 are all biased forward and upward by the spring 42 which connects the arm 27 to the bracket housing wall 23. Obviously, the spring 42 could be disposed at numerable different places and could be connected to the bracket 29 as opposed to one of the arms 27. As the spring 42 pulls the assembly 27/28/29/32/33 forwarded upward thereby forcing the seal 33 against the lower rim 37 of the manifold extension 35, the arms 27 each pivot about a pin 43 disposed one of the sidewalls 23.

During this pivotal motion of the arms 27, the movement of the arms is controlled by the pins 44 which couple the bracket 29 to the arms 27. Specifically, the pins 44 are fixedly mounted to the bracket 29. The pins 44 also tide in the slots 45 disposed in each arm 27 as well as the transverse slot 25 disposed in the lower wall extension 24. Further, the tab 46 disposed on each arm 27 includes another pin 47 that rides in the curved slot 26. In addition to the pins 44, the bracket 29 is also connected to a pair of pins 48 which also ride in the transverse slot 25.

Figure 8:
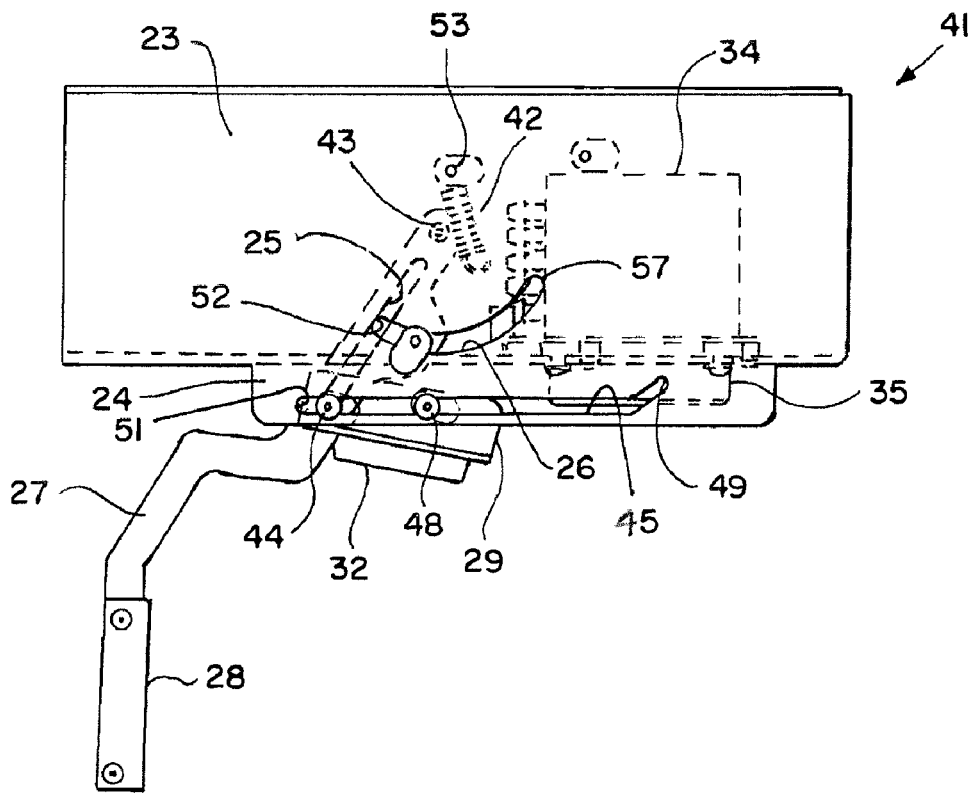

Referring back to FIG. 3, in the closed position shown, a pin 48 is connected to the bracket 29 is nested against the forward end 49 of the transverse slot 25 which, as best shown in FIG. 8, is curved forwardly and upwardly. The shape of the transverse slot 26 at its forward end 49 moves the bracket 29, cup 32 and seal 33 forwardly and upwardly to assume the closed/seal position shown in FIG. 3.

Figure 4:
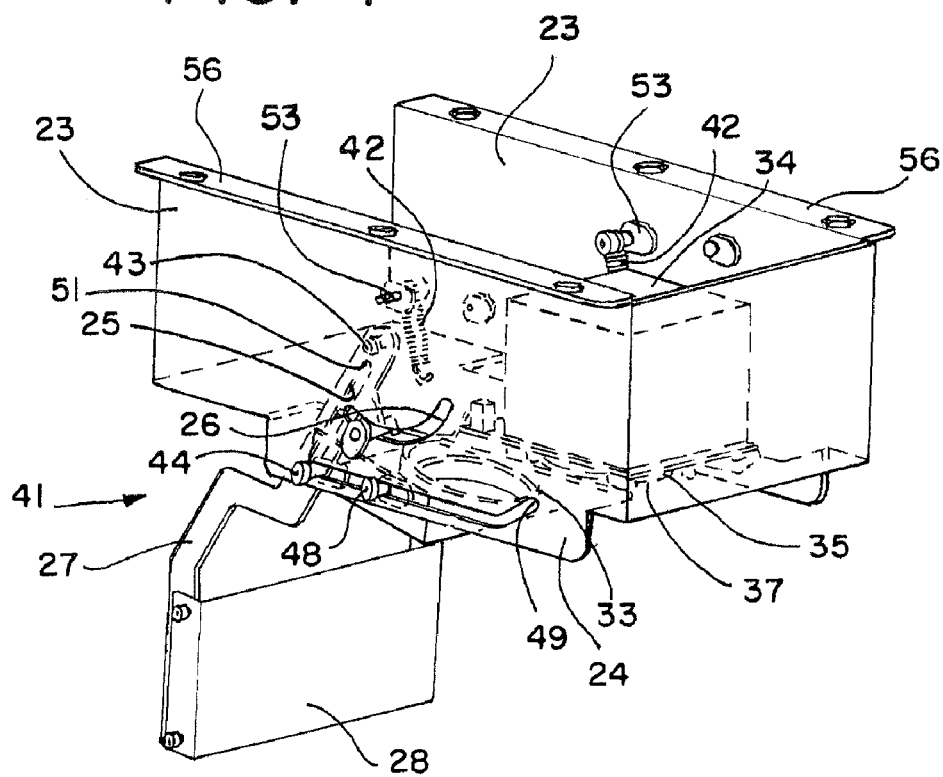
FIG. 4 is left front perspective view of the manifold/nozzle closure mechanism shown in FIGS. 1-3 in the fully open or dispense position.

In contrast, as shown in FIG. 4, in the fully open/dispense position, the pin 44 has been pushed back against the rearward end 51 of the transverse slot 25 against the bias of the spring 42. The rearward end 51 of the slot 25 is best seen in FIGS. 3 and 8. Similarly, the pin 47 is disposed against the rearward end 52 of the slot 26 (see FIGS. 3 and 8). Also shown in FIGS. 3-4 is the pin 53 that secures the spring 42 against the wall 23. A separate spring 42 may be used for each arm 27 or a single spring 42 may suffice.

Figure 5:
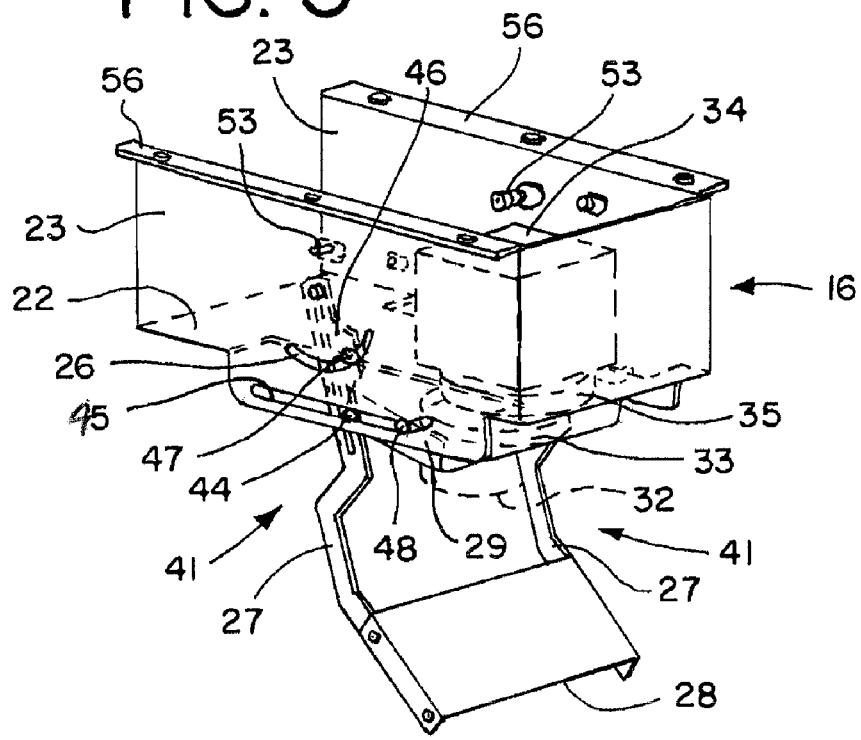
FIG. 5 is left front perspective view of the manifold/nozzle closure mechanism shown in FIGS. 1-4 between the fully open and fully closed positions.
Figure 6:
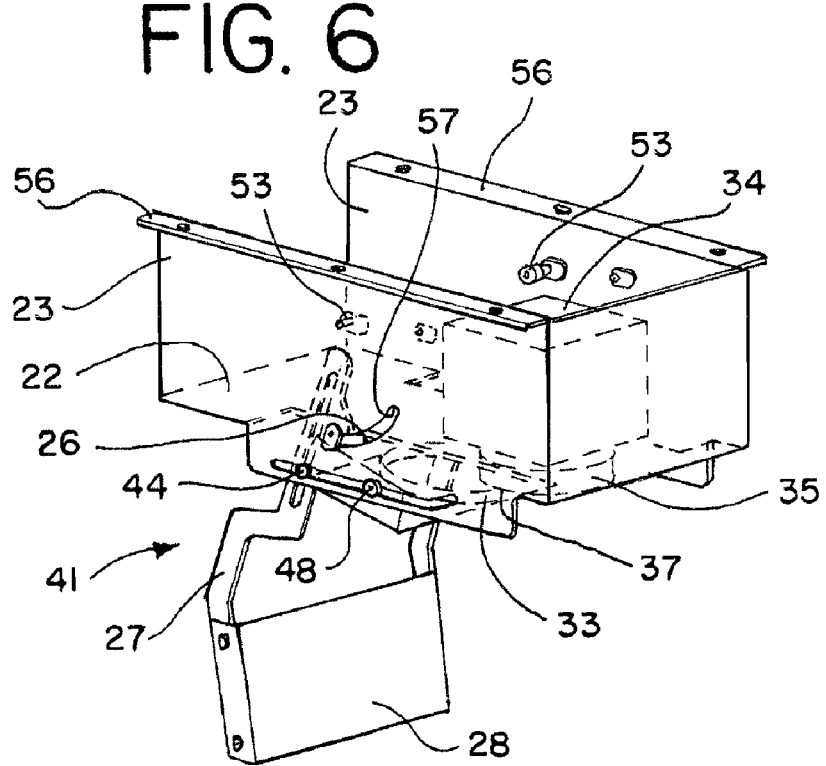
FIG. 6 is another left front perspective view of the manifold/nozzle closure mechanism shown in FIGS. 1-4 between the fully open and fully closed positions.

In FIGS. 5 and 6, the pin 48 is disposed in the horizontal portion of the slot 25 and therefore parallel with the pin 44 as the closure mechanism is either moved away from or towards the nozzles holder 35. The cup 32 as shown in FIG. 5 may be frictionally fitted to the bracket 29 below the seal 33. The cup 32 may be disposable or removable and cleanable Preferably, but not necessarily, the seal 32 is fastened to the bracket 29 by glue or adhesive although other attachment means may be utilized. The lips 56 disposed on top of the walls 23 can be conveniently used to mount the closure mechanism 41 to the housing 11 or manifold cover 15 (see FIG. 1).

Figure 7:
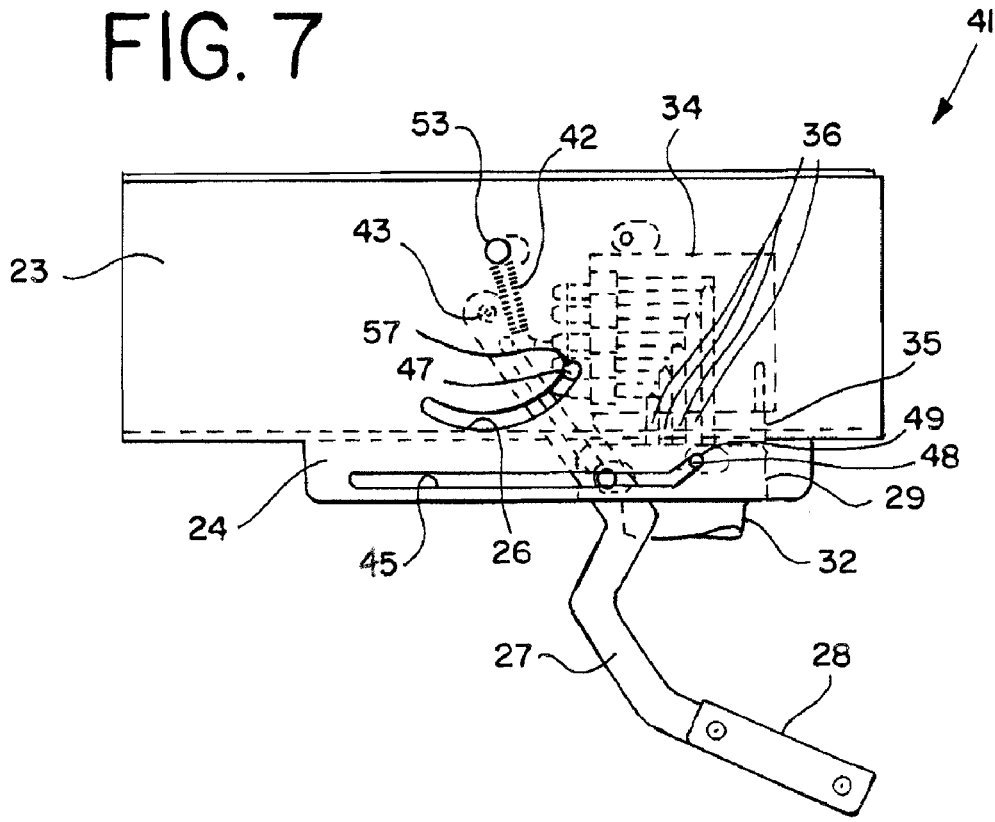
FIGS. 7 and 8 are left side elevational views of the closure mechanism shown in FIGS. 1-6.
Figure 10:
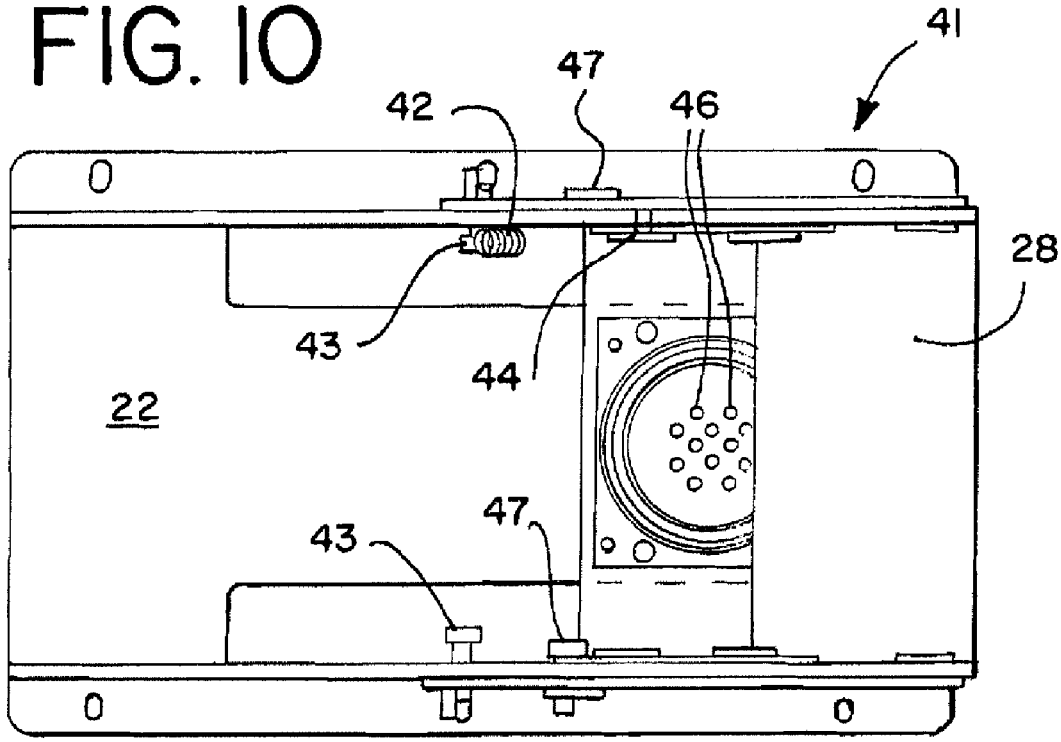

In FIGS. 7 and 8, the arms 27 and plate 28 are shown in their forward or closed position. The pins 47 and 48 are nested at the forward ends 57, 49 of the slots 26, 25 respectively. FIGS. 9-10 ate bottom views of the closure mechanism 41.

A nozzle block 34 and lower extension 35 are illustrated in FIGS. 11 and 12. As opposed to be mounted on the bracket 29, FIGS. 11 and 12 illustrates the possibility of the seal 33 being disposed on the lower rim 35 of the manifold block 34.

The cup 32 and seal 33 are illustrated in FIG. 13 is joined together. Preferably, the cup 32 is fictionally fit within the seal 33. An exploded view of the seal 33 and cup 32 is provided in FIG. 14. A perspective view of the cup/seal bracket 29 is shown in FIG. 15. The cup 32 is frictionally received in the opening 30*a* and the pins 44 and 48 are received within the holes 44*a* and 48*a* respectively.

Therefore, the manifold/nozzle closure system 41 provides a simple and efficient mechanism for moving a sealing element 33 and cup 32 vertically upward to engage a lower extension of a manifold to reduce exposure of fluid nozzles to air and to catch drips. The closure mechanism 41 also provides an easy and convenient means for moving the seal 33 and cup 32 downward prior to moving the seal 33 and cup 32 laterally rearward to a position disposed away from the fluid path. By employing a spring bias, the mechanism 41 provides simple means for returning the seal 33 to 32 to the original sealed/closed position automatically.

It will be noted that the disclosed embodiment includes a manifold block 34/35 with a plurality of nozzles 36. It is anticipated that the disclosed closure mechanism would be applicable to systems with a single nozzle dispense. It is also anticipated that the disclosed mechanism 41 could be used to retrofit existing dispensers 10.

The foregoing description of the exemplary embodiment has been presented for purposes of illustration and description. This disclosure is not intended to be limited to particular embodiment illustrated herein and the alternative embodiments described herein. Other alternatives, modifications and variations will be apparent to those skilled in the art in light of the above disclosure. The disclosed closure system is applicable to almost any fluid dispensing apparatus that dispenses single or multiple fluids. Accordingly, this disclosure is intended to embrace all alternatives, modifications and variations that fall within the spirit and scope of the appended claims.

What is claimed:

1. A manifold and closure system for a fluid dispenser, the manifold and closer system comprising:
   a manifold housing supporting a manifold, the manifold comprising at least one nozzle, the manifold housing comprising a sidewall,
   the sidewall being pivotally connected to an arm, the sidewall comprising a lateral slot and a curved slot,
   the arm comprising a proximal end pivotally connected to the sidewall, the arm further comprising a distal end and an elongated slot disposed between the proximal and distal ends of the arm, the arm further comprising a first pin slidably received in the curved slot of the sidewall to slidably connect the arm to the sidewall, a bracket supporting a cup and a seal, the bracket being coupled to the arm and the sidewall by a second pin that extends from the bracket through the lateral slot in the sidewall and a through the elongated slot of the arm, the bracket further being coupled to the sidewall by a third pin that extends through the lateral slot of the sidewall and laterally between the first pin and the manifold.

2. The manifold and closure system of claim 1 wherein the lateral slot in the sidewall comprises a forward end that slants upward vertically at an angle of less than 90°.

3. The manifold and closure system of claim 2 wherein a portion of the lateral slot disposed between the forward and rearward end of the lateral slot is substantially straight and substantially horizontal.

4. The manifold and closure system of claim 1 further comprising a biasing member that biases the arm and bracket towards the manifold.

5. The manifold and closure system of claim 4 wherein the biasing member biases the seal into engagement with the manifold.

6. The manifold and closure system of claim 4 wherein the biasing member is a spring.

7. The manifold and closure system of claim 1 wherein the cup is removable from the seal and bracket.

8. The manifold and closure system of claim 7 wherein the cup is disposable.

9. The manifold and closure system of claim 1 further comprising a second arm disposed opposite the bracket from the other arm and a second sidewall disposed opposite the manifold from the other sidewall, the second arm being pivotally connected to the second sidewall.

10. The manifold and closure system of claim 9 further comprising a push plate disposed between and connecting distal ends of the arms.

11. A closure system for a fluid outlet, the system comprising:

a housing comprising a pair of spaced-apart sidewalls, a pair of spaced-apart arms, a bracket extending between and connecting the arms, each sidewall being pivotally connected to a proximal end of one arm, each sidewall comprising a lateral slot and a curved slot, each arm further comprising a distal end and an elongated slot disposed a proximal and distal ends, a first pair of outwardly directed pins with one pin of the first pair connected to each arm, the first pins being slidably received in the curved slot of one of the sidewalls to slidably connect each arm to one of the sidewalls, the bracket supporting a cup and a seal, the bracket being disposed between and coupled to the arms and sidewalls by a second pair of oppositely directed pins that extend outward from the bracket, each pin of the second pair of pins extending through the lateral slot in one of the sidewalls and through the elongated slot of one of the arms, the bracket further being coupled to each sidewall by a third pair of oppositely directed pins that extend outward from the bracket, each pin of the third pair of pins extending through the lateral slot of one of the sidewalls and laterally between the first pair of pins and the distal ends of the arms.

12. The closure system of claim 11 further comprising a biasing member that biases each arm and the bracket towards a closed/sealed position.

13. The closure system of claim 11 wherein the cup is removable from the seal and bracket.

14. The closure system of claim 11 wherein the cup is disposable.

15. The closure system of claim 12 wherein the biasing member comprises a pair of springs linking each arm to one of the sidewalls.

16. The closure system of claim 11 further comprising a push plate disposed between and connecting distal ends of the arms.

17. The closure system of claim 11 wherein the lateral slot in each sidewall comprises a forward end that slants upward vertically at an angle of less than 90°.

18. The manifold and closure system of claim 17 wherein a portion of each lateral slot disposed between the forward and a rearward end of the lateral slot is substantially straight and substantially horizontal.

\* \* \* \* \*